(12) United States Patent
Noguchi et al.

(10) Patent No.: US 11,513,527 B2
(45) Date of Patent: Nov. 29, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Yasushi Shoda, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 181 days.

(21) Appl. No.: 16/805,884

(22) Filed: Mar. 2, 2020

(65) Prior Publication Data

US 2020/0285245 A1 Sep. 10, 2020

(30) Foreign Application Priority Data

Mar. 7, 2019 (JP) .............................. JP2019-041879

(51) Int. Cl.
*G05D 1/02* (2020.01)
*G08G 1/14* (2006.01)
*B60W 30/06* (2006.01)

(52) U.S. Cl.
CPC ........... *G05D 1/0225* (2013.01); *B60W 30/06* (2013.01); *G08G 1/143* (2013.01)

(58) Field of Classification Search
CPC .............. G05D 1/0225; B60W 30/06; B60W 2556/45; B60W 50/14; B60W 2050/146; G08G 1/143; G08G 1/0968; G08G 1/144; G08G 1/146; G08G 1/149; G08G 1/096725; B62D 15/0285; B60K 2370/566
USPC ........................................................... 701/23
See application file for complete search history.

(56) References Cited

U.S. PATENT DOCUMENTS

| | | | |
|---|---|---|---|
| 9,947,223 B2* | 4/2018 | Mielenz | G05D 1/0246 |
| 10,816,351 B1* | 10/2020 | Yao | G01C 21/3492 |
| 10,990,112 B2* | 4/2021 | Altinger | G06Q 50/30 |
| 2012/0188100 A1 | 7/2012 | Min et al. | |
| 2013/0275032 A1 | 10/2013 | Yorke et al. | |
| 2017/0025004 A1* | 1/2017 | Nordbruch | G08G 1/04 |
| 2017/0039851 A1 | 2/2017 | Nordbruch | |
| 2017/0076602 A1 | 3/2017 | York et al. | |
| 2017/0178502 A1* | 6/2017 | Kawasaki | G08G 1/096822 |
| 2017/0297625 A1* | 10/2017 | Irion | G08G 1/148 |
| 2017/0313306 A1* | 11/2017 | Nordbruch | G05D 1/0225 |

(Continued)

FOREIGN PATENT DOCUMENTS

| | | |
|---|---|---|
| CN | 105283912 | 1/2016 |
| CN | 106530802 | 3/2017 |

(Continued)

OTHER PUBLICATIONS

KR20200056495A.translate (Year: 2020).*

(Continued)

*Primary Examiner* — B M M Hannan
(74) *Attorney, Agent, or Firm* — Amin, Turocy & Watson, LLP

(57) ABSTRACT

A vehicle control device is a vehicle control device mounted in a vehicle and includes an information provider configured to transmit information on a route from a parking position to a boarding position of the vehicle to a terminal device.

11 Claims, 12 Drawing Sheets

(56) References Cited

U.S. PATENT DOCUMENTS

| | | | |
|---|---|---|---|
| 2018/0182200 A1* | 6/2018 | Gebremeskel | G07F 17/0057 |
| 2018/0233033 A1* | 8/2018 | Nordbruch | G08G 1/149 |
| 2018/0286249 A1* | 10/2018 | Nordbruch | G08G 1/164 |
| 2018/0341257 A1* | 11/2018 | Nordbruch | B60T 7/18 |
| 2019/0243368 A1* | 8/2019 | Seki | G05D 1/0011 |
| 2019/0367036 A1* | 12/2019 | Brombach | B60W 40/08 |
| 2019/0390971 A1* | 12/2019 | Shaginyan | G08G 1/096816 |
| 2020/0004844 A1* | 1/2020 | Hu | H04L 67/1097 |
| 2020/0156703 A1* | 5/2020 | Matsuda | B60W 30/095 |
| 2020/0159251 A1* | 5/2020 | Iwasaki | G06Q 10/20 |
| 2020/0191595 A1* | 6/2020 | Chipouras | G08G 1/096838 |
| 2020/0207333 A1* | 7/2020 | Miller | B62D 15/0285 |
| 2020/0247430 A1* | 8/2020 | Rao | G01C 21/3438 |
| 2021/0380096 A1* | 12/2021 | Katoh | B60W 30/06 |
| 2022/0011775 A1* | 1/2022 | Zhu | G05D 1/0088 |

FOREIGN PATENT DOCUMENTS

| | | | |
|---|---|---|---|
| CN | 108482366 | 9/2018 | |
| CN | 111727142 A * | 9/2020 | B62D 15/0285 |
| JP | 2002-312439 | 10/2002 | |
| JP | 2002312439 A * | 10/2002 | |
| JP | 2006-302187 | 11/2006 | |
| JP | 2015-516772 | 6/2015 | |
| JP | 2017-535991 | 11/2017 | |
| JP | 2017-538618 | 12/2017 | |
| JP | 2019-026067 | 2/2019 | |
| KR | 20200056495 A * | 5/2020 | B60R 25/209 |
| KR | 20200087329 A * | 7/2020 | G08G 1/149 |

OTHER PUBLICATIONS

CN111727142A—Translate (Year: 2020).*

Japanese Office Action for Japanese Patent Application No. 2019-041879 dated May 10, 2022.

Chinese Office Action for Chinese Patent Application No. 202010129117.5 dated Jan. 6, 2022.

* cited by examiner

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2019-041879, filed on Mar. 7, 2019, the contents of which are hereby incorporated by reference into the present application.

BACKGROUND OF THE INVENTION

Field of the Invention

The present invention relates to a vehicle control device, a vehicle control method, and a storage medium.

Description of Related Art

In the related art, a technology for transmitting information on positions of vehicles of a public transportation facility or the like to a terminal device of a user is known. For example, a guidance system that provides a guidance service in a public transportation facility in which a device on a public transportation facility side provides position information of the public transportation facility or the like to a mobile terminal of a user according to data such as a destination transmitted by the mobile terminal has been disclosed (see, for example, Japanese Unexamined Patent Application, First Publication No. 2002-312439).

SUMMARY OF THE INVENTION

In automated valet parking using a technology for automatically controlling a vehicle, a process of automatically moving the vehicle to a boarding position in response to a request is performed when an occupant of the vehicle requests exiting of a parked vehicle. Since a public transportation facility travels on a predetermined route, a user using the public transportation facility can infer causes of a delay even when arrival is delayed. On the other hand, in an automated exit process in automated valet parking, since a movement route of a vehicle greatly varies depending on an external environment or the like, there is concern that an occupant of the vehicle may not be able to infer causes of a delay and may have anxiety when arrival of the vehicle is delayed. Accordingly, there is concern that convenience of automated valet parking may be degraded.

The present invention has been made in view of such circumstances, and an object of the present invention is to provide a vehicle control device, a vehicle control method, and a storage medium capable of providing information on a vehicle to an occupant in an automated exit process of automated valet parking.

A vehicle control device, a vehicle control method, and a storage medium according to the present invention have adopted the following configurations.

(1) A vehicle control device according to an aspect of the present invention is mounted in a vehicle, the vehicle control device including: an information provider configured to transmit information on a route from a parking position to a boarding position of the vehicle to a terminal device.

(2) In the aspect (1), the vehicle control device further includes: an acquirer configured to acquire an automated exit request for the vehicle.

(3) In the aspect (2), the information provider is configured to transmit outside-vehicle information of the vehicle to the terminal device in a case where the information provider has acquired information on a delay of the vehicle during an automated exit process of the vehicle based on the automated exit request.

(4) In the aspect (2) or (3), the information provider is configured to transmit outside-vehicle information of the vehicle to the terminal device in a case where the vehicle has stopped during a predetermined time or more in the automated exit process of the vehicle based on the automated exit request.

(5) In any one of the aspects (2) to (4), the information provider is configured to transmit outside-vehicle information of the vehicle to the terminal device in a case where the vehicle has traveled during a predetermined time or more and at a predetermined speed or less in the automated exit process of the vehicle based on the automated exit request.

(6) In any one of the aspects (3) to (5), the information provider is configured to transmit information on a position at which the outside-vehicle information of the vehicle has been acquired, together with the outside-vehicle information of the vehicle, to the terminal device.

(7) In any one of the aspects (2) to (6), the acquirer is configured to acquire the automated exit request transmitted from the terminal device, and the information provider is configured to transmit the route information to the terminal device in a case where the acquirer has acquired the automated exit request.

(8) In any one of the aspects (2) to (7), the acquirer further is configured to acquire a request for acquisition of outside-vehicle information of the vehicle transmitted from the terminal device, and the information provider is configured to transmit the outside-vehicle information of the vehicle to the terminal device in a case where the acquirer has acquired the request for acquisition of the outside-vehicle information.

(9) In any one of the aspects (1) to (8), the information provider is configured to transmit outside-vehicle image information of the vehicle to the terminal device.

(10) In any one of the aspects (1) to (9), the information provider is configured to transmit, to the terminal device, information on change in a route to the boarding position.

(11) In any one of the aspects (1) to (10), the information provider is configured to transmit, to the terminal device, information on a required time required for movement from a position of the vehicle to the boarding position.

(12) A vehicle control device according to another aspect of the present invention is mounted in a vehicle, the vehicle control device including: an information provider configured to transmit information on the vehicle to a terminal device in a case where the information provider has acquired information on a delay of the vehicle during an automated exit process of the vehicle.

(13) A vehicle control method according to an aspect of the present invention includes: transmitting, by a computer of a vehicle control device mounted in a vehicle, information on a route from a parking position to a boarding position of the vehicle to a terminal device.

(14) A vehicle control method according to another aspect of the present invention includes: transmitting, by a computer of a vehicle control device mounted in a vehicle, information on the vehicle to a terminal device in a case where information on a delay of the vehicle has been acquired during an automated exit process of the vehicle.

(15) A non-transitory computer-readable storage medium according to an aspect of the present invention stores a program, the program causing a computer of a vehicle control device mounted in a vehicle to transmit information on a route from a parking position to a boarding position of the vehicle to a terminal device.

(16) A non-transitory computer-readable storage medium according to another aspect of the present invention stores a program, the program causing a computer of a vehicle control device mounted in a vehicle to transmit information on the vehicle to a terminal device in a case where information on a delay of the vehicle has been acquired during an automated exit process of the vehicle.

According to (1), (2), (7), (11), (13), and (15), route information from the parking position to the boarding position of the vehicle is provided to the terminal device in an automated exit process of automated valet parking. Thus, it is possible to improve convenience of the automated exit process.

According to (12), (14), and (16), when a delay has occurred in the automated exit process, the information on the vehicle is provided to the terminal device. Thus, the occupant can recognize the occurrence of the delay or causes thereof.

According to (3) to (6), (8), and (9), when a delay has occurred in the automated exit process, the outside-vehicle information of the vehicle or the information on the position at which the outside-vehicle information of the vehicle has been acquired is provided to the terminal device. Thus, the occupant can recognize the occurrence of the delay or causes thereof.

According to (10), the route information after change is provided to the terminal device in the automated exit process. Thus, the occupant can recognize that the route change has been performed.

DETAILED DESCRIPTION OF THE INVENTION

Hereinafter, embodiments of a vehicle control device, a vehicle control method, and a storage medium of the present invention will be described with reference to the drawings.

First Embodiment

Figure 1:
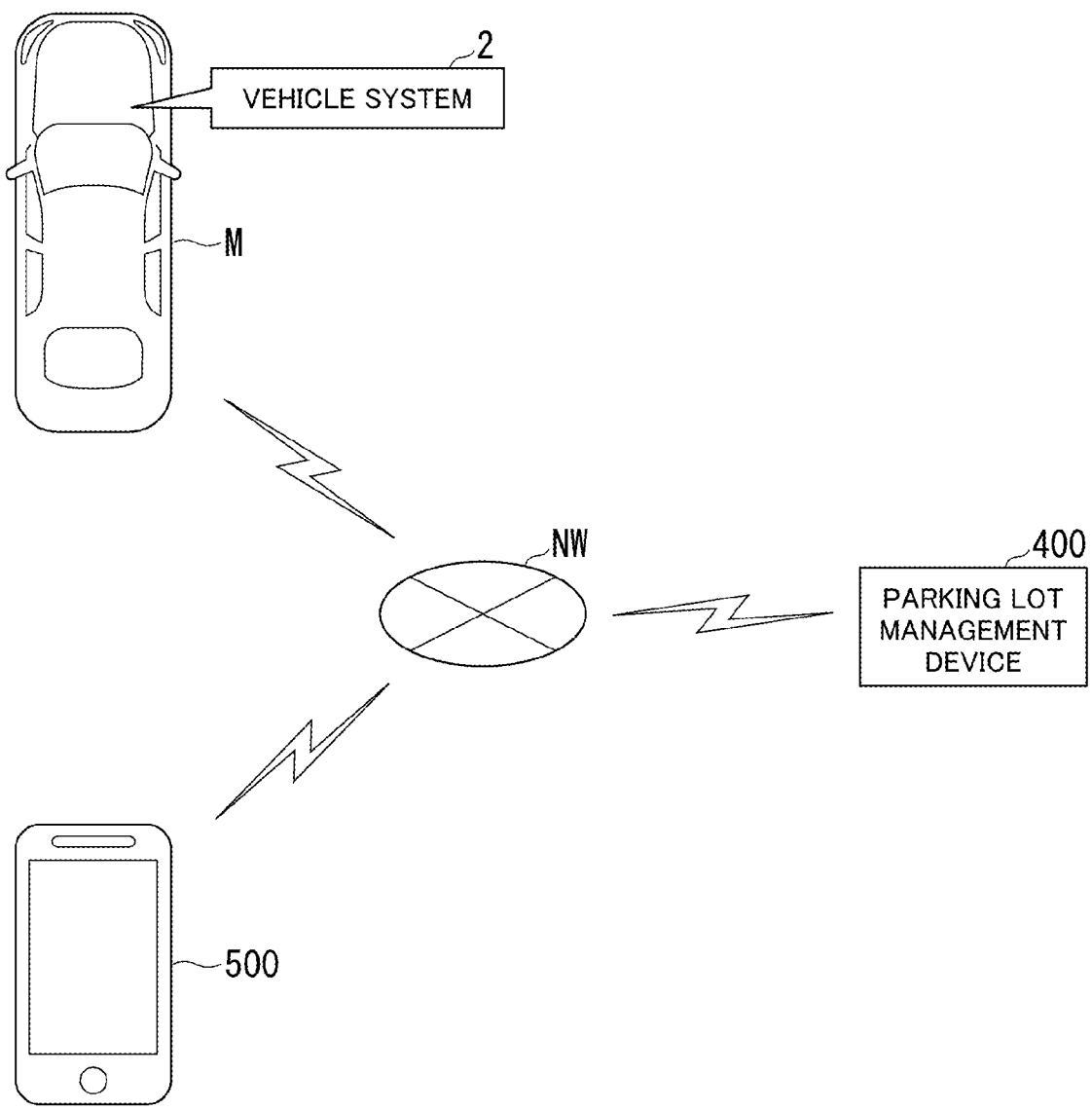
FIG. 1 is a configuration diagram of a parking lot management system including a vehicle system according to a first embodiment.

FIG. 1 is a configuration diagram of a parking lot management system 1 including a vehicle system 2 according to a first embodiment. The parking lot management system 1 includes, for example, one or more vehicles (a host vehicle M) in which the vehicle system 2 has been mounted, one or more parking lot management devices 400, and one or more terminal devices 500. These components can communicate with each other via a network NW. The network NW includes a cellular network, a Wi-Fi network, the Internet, a wide area network (WAN), a local area network (LAN), a public line, a provider device, a dedicated line, a wireless base station, and the like. These components may perform wireless communication directly without via the network NW. Details of the host vehicle M and the parking lot management device 400 will be described below.

The terminal device 500 is, for example, a terminal device that can be carried by an occupant of the host vehicle M, such as a smartphone, a tablet terminal, and a personal computer. The terminal device 500 communicates with the host vehicle M to transmit a request from the occupant of the host vehicle M to the host vehicle M or performs a push notification based on information received from the host vehicle M or the parking lot management device 400.

[Overall Configuration]

Figure 2:
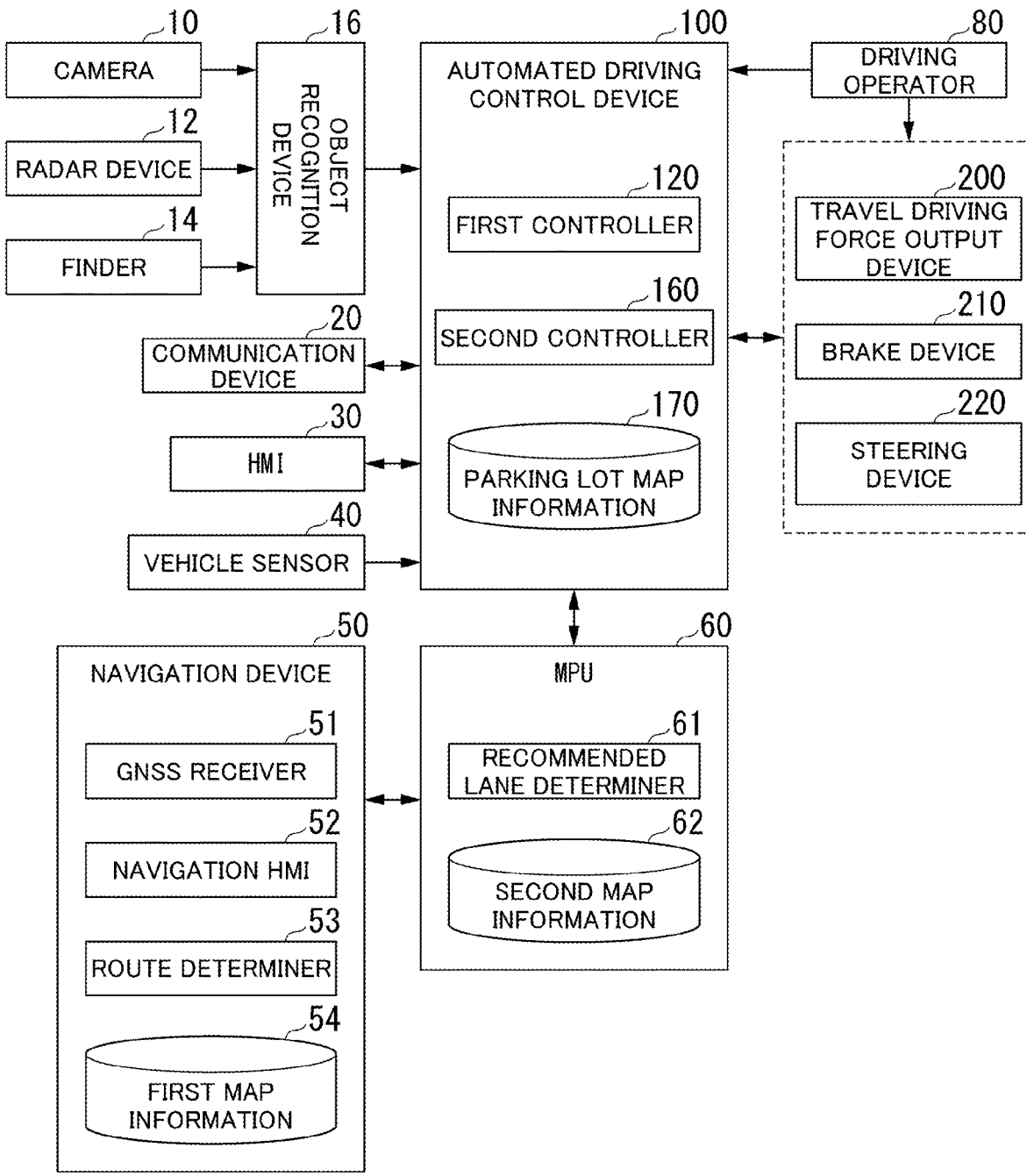
FIG. 2 is a configuration diagram of a vehicle system using a vehicle control device according to the first embodiment.

FIG. 2 is a configuration diagram of a vehicle system 2 using a vehicle control device according to a first embodiment. A vehicle in which the vehicle system 2 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 2 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100 (an example of a "vehicle control device"), a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 2 is merely an example, and part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to any place on a vehicle in which the vehicle system 2 is mounted. In the case of forward imaging, the camera 10 is attached to an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any place on the host vehicle M. The radar device 12 may detect a position and a speed of the object using a frequency modulated continuous wave (FM-CW) scheme.

The finder 14 is a light detection and ranging (LIDAR). The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 2.

The communication device 20, for example, communicates with another vehicle or a parking lot management device present around the host vehicle M, or various server devices using a cellular network, a Wi-Fi network, Bluetooth (registered trademark), dedicated short range communication (DSRC), or the like. Details of a function of the parking lot management device will be described below.

The HMI 30 presents various types of information to an occupant of the host vehicle M and receives an input operation from the occupant. The HMI 30 includes various display devices, speakers, buzzers, touch panels, switches, keys, and the like.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or supplemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of the terminal device 500 such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle) and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for progression to a branch destination when there is a branch place in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a variant steer, a joystick, and other operators. A sensor that detects the amount of operation or the presence or absence of operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, and a second controller 160 and holds parking lot map information 170 in a storage device such as an HDD or a flash memory. The first controller 120 and the second controller 160 are realized, for example, by a hardware processor such as a central processing unit (CPU) or a graphics processing unit (GPU) executing a program (software). Further, some or all of these components may be realized by hardware (a circuit portion; including circuitry) such as a large scale integration (LSI), an application specific integrated circuit (ASIC), a fieldprogrammable gate array (FPGA) or a graphics processing unit (GPU) or may be realized by software and hardware in cooperation. The program may be stored in a storage device (a storage device having a non-transitory storage medium) such as an HDD or a flash memory of the automated driving control device 100 in advance or may be stored in a detachable storage medium such as a DVD or a CD-ROM and installed in the HDD or the flash memory of the automated driving control device 100 by the storage medium (the non-transitory storage medium) being mounted in a drive device.

Figure 3:
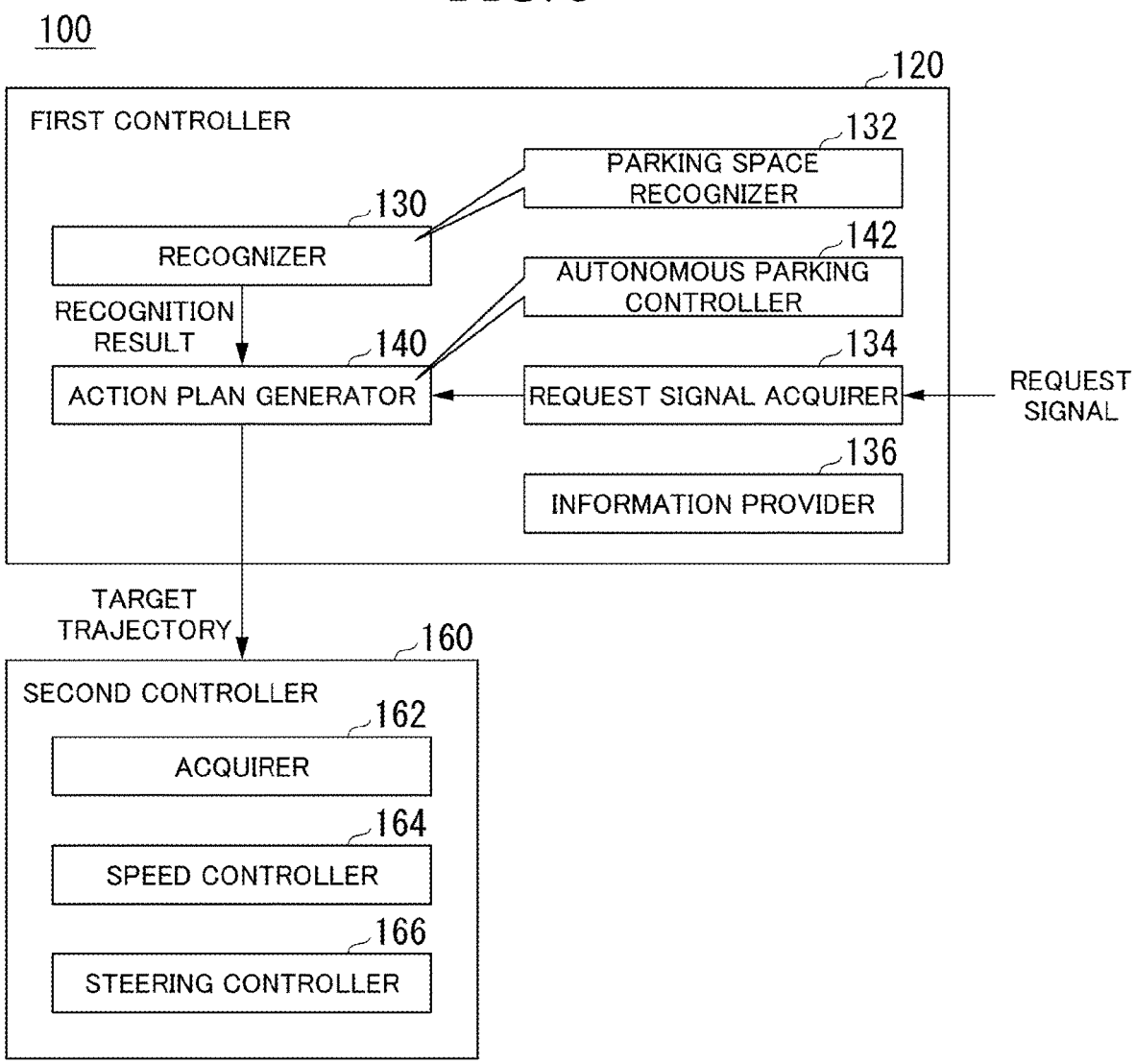
FIG. 3 is a functional configuration diagram of a first controller and a second controller according to the first embodiment.

FIG. 3 is a functional configuration diagram of the first controller 120 and the second controller 160 according to the first embodiment. The first controller 120 includes, for example, a recognizer 130, a request signal acquirer 134 (an example of an "acquirer"), an information provider 136, and an action plan generator 140. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is guaranteed.

The recognizer 130 recognizes a status such as a position, a speed, or an acceleration of an object around the host vehicle M on the basis of information input from the camera 10, the radar device 12, and the finder 14 via the object recognition device 16. The position of the object, for example, is recognized as a position at absolute coordinates with a representative point (a centroid, a drive shaft center, or the like) of the host vehicle M as an origin, and is used for control. The position of the object may be represented by a representative point such as a centroid or a corner of the object or may be represented by a represented area. The "status" of the object may include an acceleration or jerk of the object, or an "action status" (for example, whether or not the object is changing lanes or is about to change lanes).

The recognizer 130 recognizes, for example, a lane in which the host vehicle M is traveling (travel lane). For example, the recognizer 130 compares a pattern of a road marking line (for example, an arrangement of a solid line and a broken line) obtained from the second map information 62 with a pattern of a road marking line around the host vehicle M recognized from an image captured by the camera 10 to recognize the travel lane. The recognizer 130 may recognize not only the road marking lines but also a traveling road boundary (a road boundary) including the road marking line, a road shoulder, a curb, a median strip, a guard rail, or the like to recognize the travel lane. In this recognition, the position of the host vehicle M acquired from the navigation device 50 or a processing result of an INS may be additionally considered. Further, the recognizer 130 may recognize a temporary stop line, an obstacle, a red light, a toll gate, and other road events.

The recognizer 130 recognizes a position or posture of the host vehicle M with respect to a travel lane when recognizing the travel lane. The recognizer 130 may recognize, for example, a deviation of a reference point of the host vehicle M from a center of the lane and an angle formed between a traveling direction of the host vehicle M and a line connecting the center of the lane as the relative position and posture of the host vehicle M with respect to the travel lane. Instead, the recognizer 130 may recognize, for example, a position of the reference point of the host vehicle M with respect to any one of side end portions (the road marking line or the road boundary) of the travel lane as the relative position of the host vehicle M with respect to the travel lane.

The recognizer 130 includes a parking space recognizer 132 that is activated in an autonomous parking event to be described below. Details of a function of the parking space recognizer 132 will be described below.

The request signal acquirer 134 acquires a request signal transmitted by the terminal device 500 of the occupant via the communication device 20. The request signal is a parking request to be described below, a vehicle pick-up request (an automated exit request), an access request, or the like. The request signal acquirer 134 outputs the acquired request signal to the action plan generator 140.

The information provider 136 acquires information input from the camera 10, the radar device 12, and the finder 14 via the object recognition device 16, information acquired from another device via the communication device 20, the parking lot map information 170, information on the position of the host vehicle M acquired from the navigation device 50, and the like, and performs a process according to the acquired information. Details of a function of the information provider 136 will be described below.

In principle, the action plan generator 140 generates a target trajectory along which the host vehicle M will travel in the future automatically (without depending on an operation of a driver) so that the host vehicle M can travel on the recommended lane determined by the recommended lane determiner 61 and cope with a surroundings situation of the host vehicle M. The target trajectory includes, for example, a speed element. For example, the target trajectory is represented as a sequence of points (trajectory points) to be reached by the host vehicle M. The trajectory point is a point that the host vehicle M is to reach for each predetermined travel distance (for example, several meters) at a road distance, and a target speed and a target acceleration at every predetermined sampling time (for example, every several tenths of a [sec]) are separately generated as a part of the target trajectory. The trajectory point may be a position that the host vehicle M is to reach at the sampling time at every predetermined sampling time. In this case, information on the target speed or the target acceleration is represented by the interval between the trajectory points.

When the action plan generator 140 generates the target trajectory, the action plan generator 140 may set an event of automated driving. Examples of the automated driving event include a constant speed traveling event, a low speed following driving event, a lane changing event, a branching event, a merging event, a takeover event, an autonomous parking event in which a vehicle travels in an unmanned manner and is parked in valet parking or the like, an autonomous pick-up event in which a vehicle travels in an unmanned manner in valet parking or the like, exits from a parking lot, and travels by itself to a predetermined boarding position, and the like. The action plan generator 140 generates a target trajectory according to an activated event. The action plan generator 140 sets, for example, the autonomous parking event or the autonomous pick-up event on the basis of the request signal output by the request signal acquirer 134. The action plan generator 140 includes an autonomous parking controller 142 that is activated when the autonomous parking event is performed. Details of a function of the autonomous parking controller 142 will be described below.

The second controller 160 controls the travel driving force output device 200, the brake device 210, and the steering device 220 so that the host vehicle M passes through the target trajectory generated by the action plan generator 140 at a scheduled time.

Referring back to FIG. 3, the second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 on the basis of the speed element incidental to the target trajectory stored in the memory. The steering controller 166 controls the steering device 220 according to a degree of bend of the target trajectory stored in the memory. Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation from the target trajectory.

The parking lot map information 170 includes, for example, information on lanes and parking spaces in the parking lot in which the host vehicle M is parked. The parking lot map information 170 is acquired, for example, by the communication device 20 communicating with another device such as the parking lot management device 400.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Autonomous Parking Event—at the Time of Entry]

Figure 4:
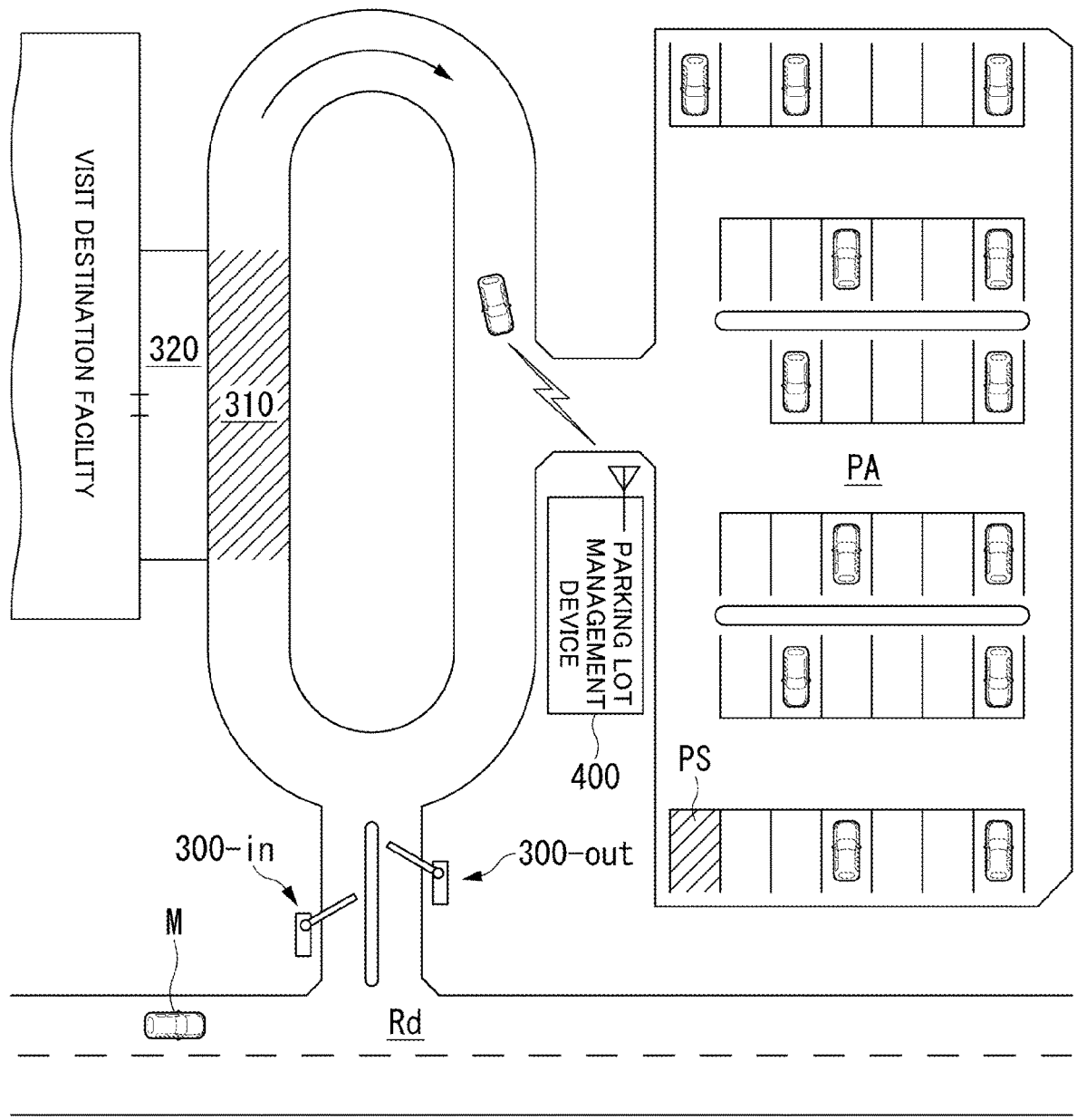
FIG. 4 is a diagram schematically showing a scene in which an autonomous parking event according to the first embodiment is executed.

The autonomous parking controller 142 parks the host vehicle M in the parking space on the basis of information acquired from the parking lot management device 400 by the communication device 20, for example. FIG. 4 is a diagram schematically showing a scene in which the autonomous parking event is executed according to the first embodiment. Gates 300-in and 300-out are provided on a route from a road Rd to a visit destination facility. The host vehicle M advances to a stop area 310 through the gate 300-in according to manual driving or automated driving. The stop area 310 faces a boarding and alighting area 320 connected to the visit destination facility. An eave for avoiding rain or snow is provided in the boarding and alighting area 320.

After the occupant alights in the stop area 310, the host vehicle M starts unmanned automated driving and starts the autonomous parking event to move to the parking space PS in a parking lot PA. A start trigger of the autonomous parking event may be, for example, any operation of an occupant, or may be wireless reception of a predetermined signal from the parking lot management device 400. When the autonomous parking controller 142 starts the autonomous parking event, the autonomous parking controller 142 controls the communication device 20 such that a parking request is transmitted to the parking lot management device 400. The host vehicle M moves from the stop area 310 to the parking lot PA according to guidance of the parking lot management device 400 or while performing its own sensing.

Figure 5:
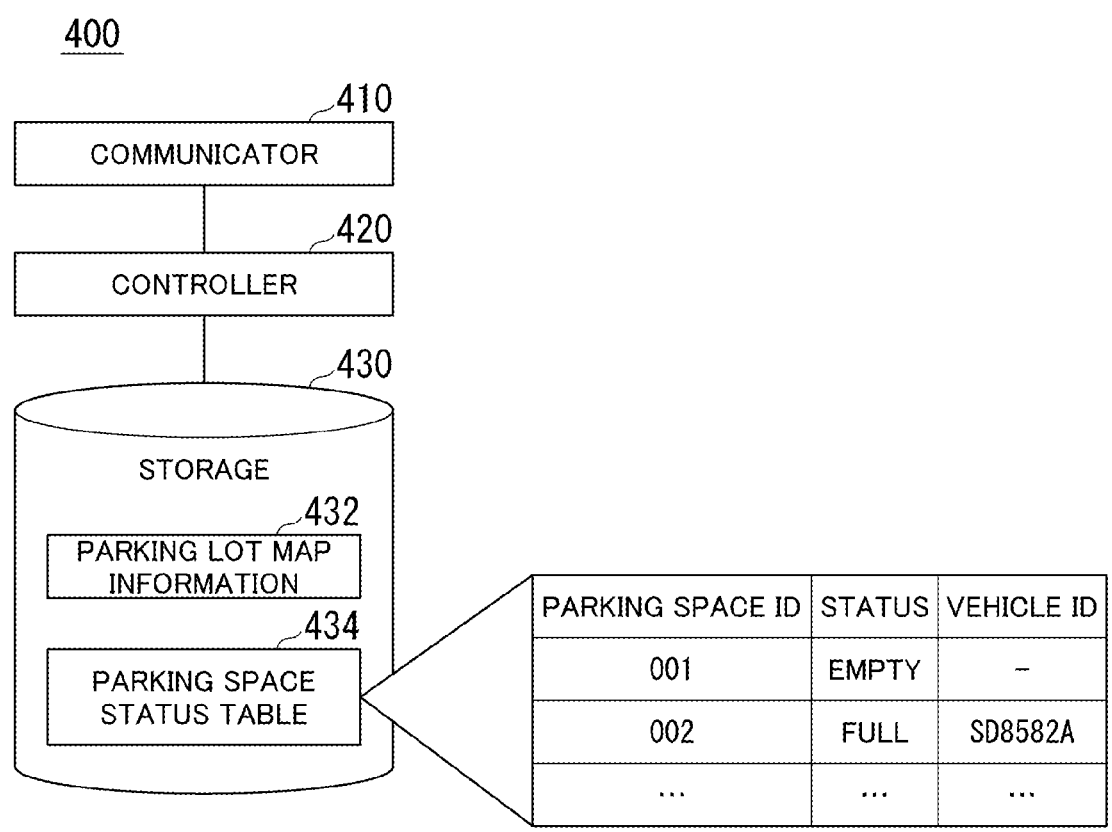
FIG. 5 is a diagram showing an example of a configuration of a parking lot management device according to the first embodiment.

FIG. 5 is a diagram showing an example of a configuration of the parking lot management device 400 according to the first embodiment. The parking lot management device 400 includes, for example, a communicator 410, a controller 420, and a storage 430. The storage 430 stores information such as parking lot map information 432 and a parking space status table 434.

The communicator 410 wirelessly communicates with the host vehicle M or other vehicles. The controller 420 guides the vehicle to the parking space PS on the basis of the information acquired by communicator 410 and the information stored in storage 430. The parking lot map information 432 is information that geometrically represents a structure of the parking lot PA. The parking lot map information 432 includes coordinates for each parking space PS. The parking space status table 434 is, for example, a table in which a status indicating whether the parking space is in an empty status or a full (parked) status and a vehicle ID that is identification information of parked vehicles when the parking space is full are associated with a parking space ID, which is identification information of the parking space PS.

When the communicator 410 receives the parking request from the vehicle, the controller 420 extracts the parking space PS that is in an empty status by referring to the parking space status table 434, acquires a position of the extracted parking space PS from the parking lot map information 432, and transmits a suitable route to the acquired position of the parking space PS to the vehicle using the communicator 410. The controller 420 instructs a specific vehicle, for example, to stop or slow down, as necessary, on the basis of positional relationships between a plurality of vehicles so that the vehicles do not advance to the same position at the same time.

In a vehicle (hereinafter, referred to as the host vehicle M) that has received the route, the autonomous parking controller 142 generates a target trajectory based on the route. When the host vehicle M approaches the parking space PS, which is a target, the parking space recognizer 132 recognizes parking frame lines or the like that partition the parking space PS, recognizes a specific position of the parking space PS, and provides the position to the autonomous parking controller 142. The autonomous parking controller 142 receives the position, corrects the target trajectory, and parks the host vehicle M in the parking space PS.

[Autonomous Pick-Up Event-at Time of Exit]

The autonomous parking controller 142 and the communication device 20 remain in an operating state even when the host vehicle M is parked. The autonomous parking controller 142 activates a system of the host vehicle M and moves the host vehicle M to the stop area 310, for example, when the communication device 20 receives a vehicle pick-up request from a terminal device of the occupant. In this case, the autonomous parking controller 142 controls the communication device 20 such that a start request is transmitted to the parking lot management device 400. The controller 420 of the parking lot management device 400 instructs a specific vehicle, for example, to stop or slow down, as necessary, on the basis of positional relationships between a plurality of vehicles so that the vehicles do not advance to the same position at the same time, similar to at the time of entry. When the host vehicle M is moved to the stop area 310 and an occupant boards the host vehicle M, the autonomous parking controller 142 stops an operation, and then, manual driving or automated driving by another functional unit is started.

The present invention is not limited to the above, and the autonomous parking controller 142 may find a parking space in an empty status by itself on the basis of detection results of the camera 10, the radar device 12, the finder 14, or the object recognition device 16 without depending on communication, and park the host vehicle M in the found parking space.

[Autonomous Pick-Up Event-Operation Flow at the Time of Exit]

Figure 6:
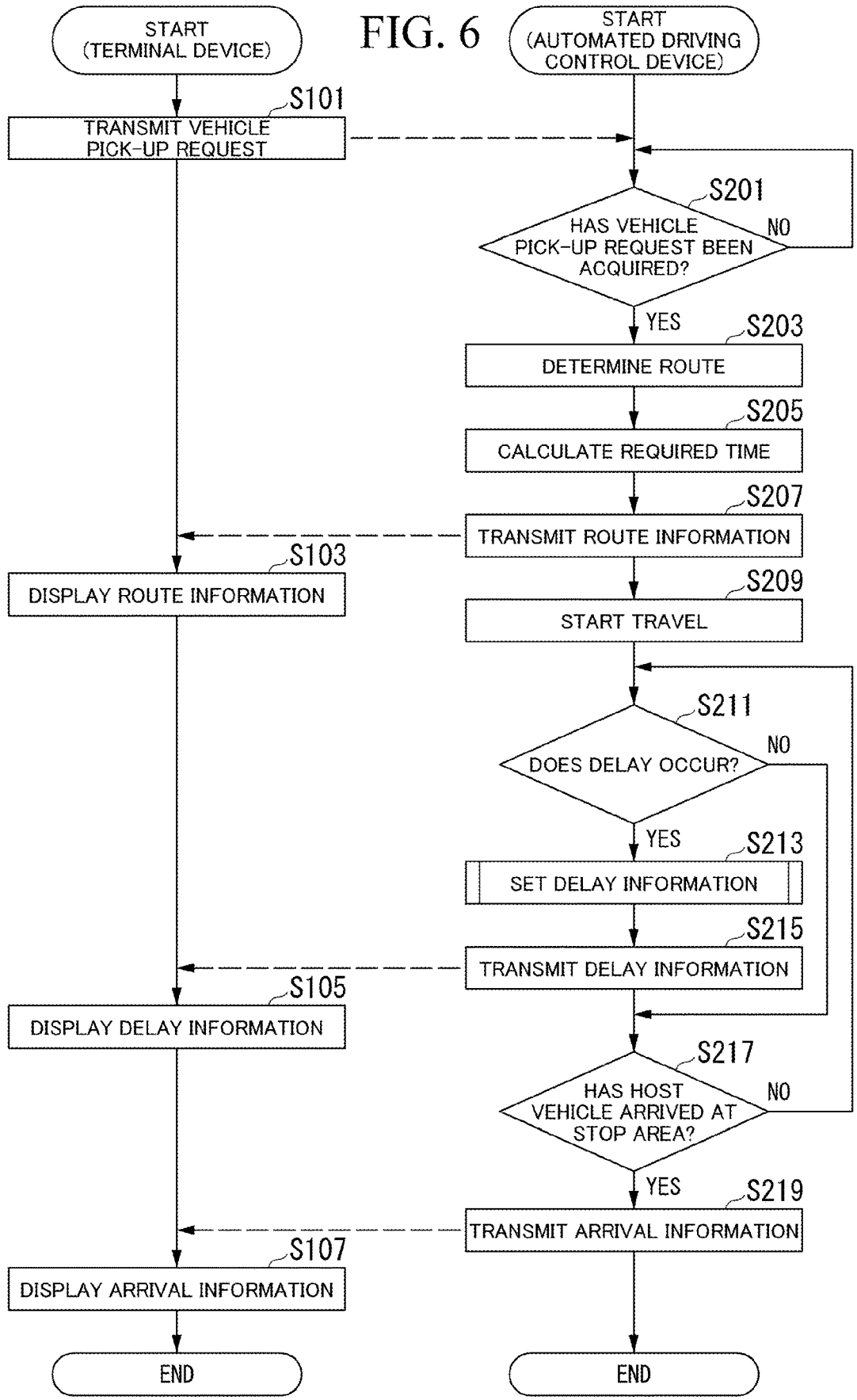
FIG. 6 is a diagram showing an example of an operation flow of at the time of exit in an autonomous pick-up event in an automated driving control device according to the first embodiment.

An operation at the time of exit of the autonomous pick-up event will be described. FIG. 6 is a diagram showing an example of an operation flow of the automated driving control device 100 according to the first embodiment at the time of exit of the autonomous pick-up event. In FIG. 6, an operation of the terminal device 500 is shown.

The autonomous parking controller 142 remains in an operating state even while the host vehicle M is parked, and continuously determines whether or not a vehicle pick-up request has been acquired via the request signal acquirer 134 (step S201). Here, when a vehicle pick-up request for the parked host vehicle M is transmitted on the basis of an operation of the terminal device 500 by the occupant (step S101), the autonomous parking controller 142 acquires the vehicle pick-up request and determines a suitable route from a parking position of the host vehicle M to a boarding position (for example, the stop area 310 adjacent to the boarding and alighting area 320) by referring to the parking lot map information 170 (step S203). The autonomous parking controller 142 may determine a route from the parking position of the host vehicle M to the stop area 310 on the basis of information on a use situation of the parking lot that is provided by the parking lot management device 400 (for example, information on a positional relationship among other vehicles in the parking lot).

Figure 8:
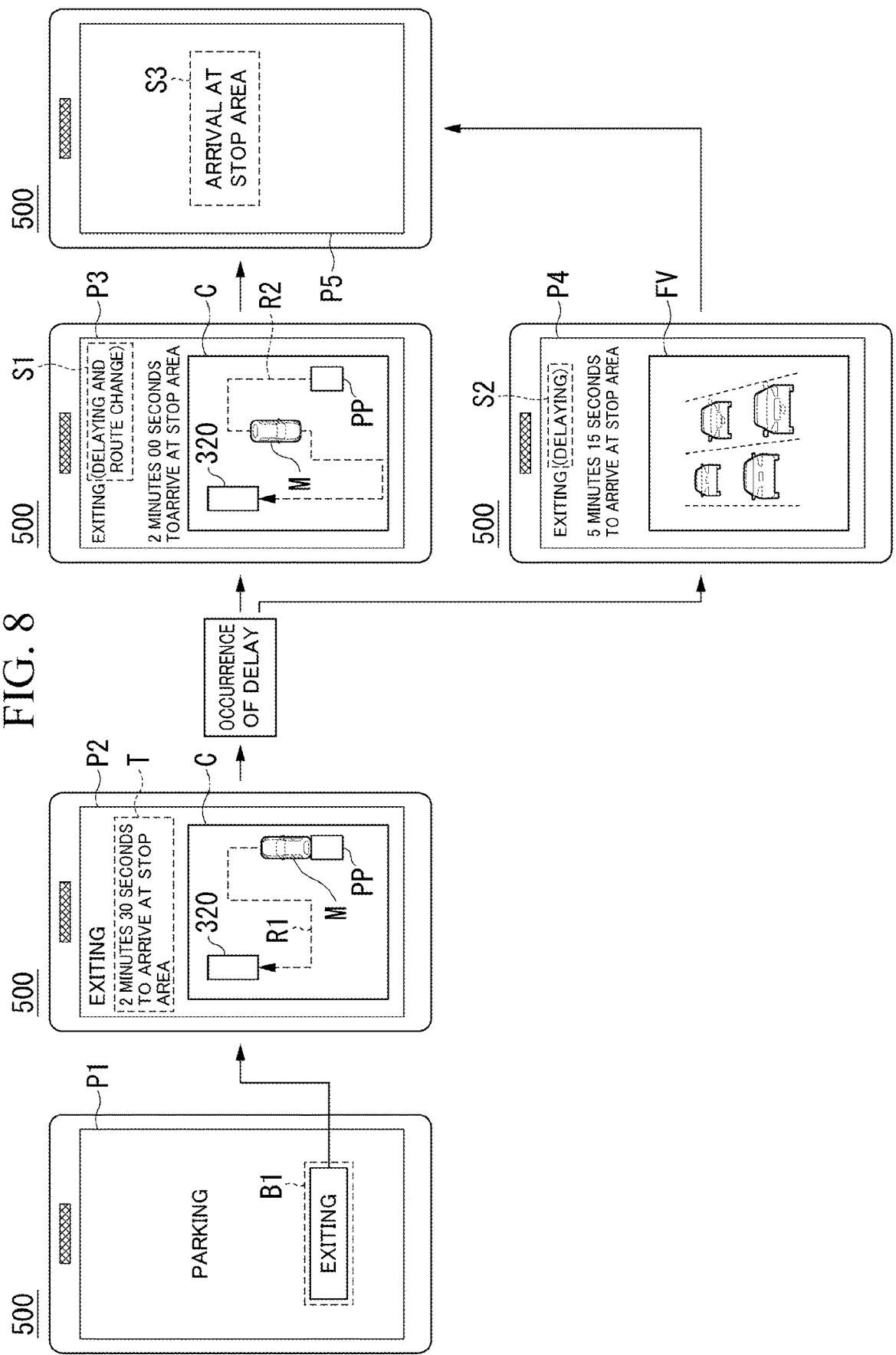
FIG. 8 is a diagram showing an example of a screen flow that is displayed on a screen of a terminal device in an automated exit process according to the first embodiment.

FIG. 8 is a diagram showing an example of a screen flow that is displayed on a screen of the terminal device 500 in the automated exit process according to the first embodiment. A screen P1 is a screen for receiving a vehicle pick-up request for the host vehicle M from the occupant. The occupant can make the vehicle pick-up request by pressing an "Exit" button B1 displayed on the screen P1.

Then, the autonomous parking controller 142 calculates a required time from the parking position of the host vehicle M to the stop area 310 for the determined route (step S205). For example, the autonomous parking controller 142 calculates the required time on the basis of a distance on the determined route, an average traveling speed in the parking lot, and the like. The autonomous parking controller 142 may calculate the required time on the basis of the information on the use situation of the parking lot provided from the parking lot management device 400 (for example, the information on the positional relationship among other vehicles in the parking lot or traffic jam information). The autonomous parking controller 142 may calculate a time of arrival at the stop area 310 for the determined route.

Then, the information provider 136 transmits the route information on the route determined by the autonomous parking controller 142 to the terminal device 500 (step S207). Thereby, the route information is displayed on a display unit of the terminal device 500 (step S103). This route information includes map information in which the determined route has been displayed to be superimposed on a map of the parking lot, information on the calculated required time, and the like.

A screen P2 of the terminal device 500 shown in FIG. 8 is a screen for displaying the route information. Map information C and a character string T such as "2 minutes and 30 seconds until arrival at the stop area", which is the information on the required time, are displayed on the screen P2. In the map information C, a route R1 from a parking position PP (for example, the parking space PS in which the host vehicle M has been parked in FIG. 4) to the stop area 310 is indicated. Using a timer function included in the terminal device 500, the required time included in the screen P2 may be updated to decrease over time. An image imitating a vehicle may be displayed on the route R1 indicated by the map information C, and the image may be updated to move toward the stop area 310 over time.

Then, the autonomous parking controller 142 generates a target trajectory on the basis of the determined route and outputs the target trajectory to the second controller 160, thereby starting traveling from the parking position PP to the stop area 310 (step S209).

Then, the autonomous parking controller 142 determines whether or not a delay occurs during traveling from the parking position PP to the stop area 310 (step S211). This delay occurs due to, for example, traffic jam in a parking lot or occurrence of a broken-down vehicle. For example, the autonomous parking controller 142 may determine that a delay has occurred when the host vehicle M has stopped for a predetermined time or more in the automated exit process or when the host vehicle M has traveled for a predetermined time or more and a predetermined speed or less in the automated exit process. The "delay occurs" may include not only a case in which the delay actually occurs, but also a stage before the delay occurs, that is, a case in which a delay is likely to occur.

Figure 7:
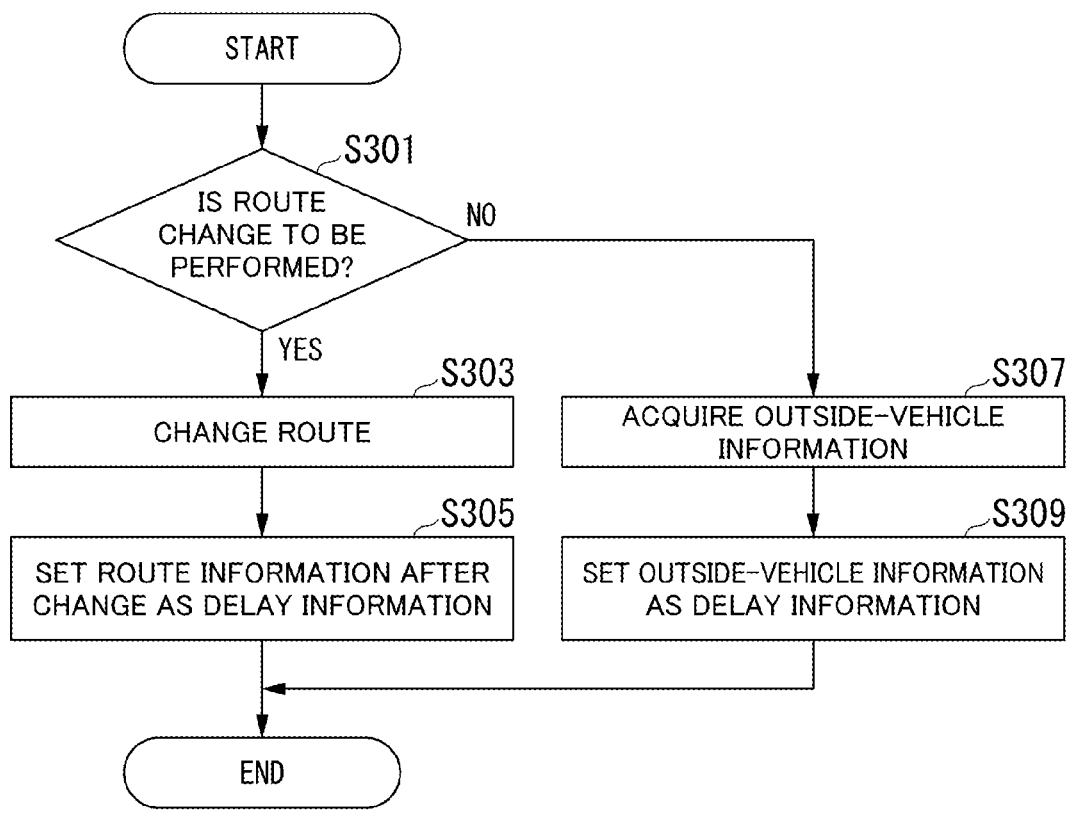
FIG. 7 is a diagram showing an example of an operation flow at the time of setting delay information in the automated driving control device according to the first embodiment.

When the autonomous parking controller 142 has determined that the delay occurs, the information provider 136 sets delay information for notifying the occupant waiting for the arrival of the host vehicle M of the occurrence of the delay (step S213). That is, the information provider 136 sets delay information when information on the delay of the host vehicle M has been acquired in the automated exit process of the host vehicle M. Here, the information on the delay of the host vehicle M may include not only information indicating that a delay actually has occurred, but also information indicating that a stage before a delay has occurred, that is, that a delay is likely to occur. FIG. 7 is a diagram showing an example of an operation flow at the time of setting of delay information in the automated driving control device 100 according to the first embodiment. In a delay information setting process, the autonomous parking controller 142 determines whether or not route change is to be performed in order to eliminate the delay (step S301). For example, the autonomous parking controller 142 determines whether or not the route change is to be performed on the basis of the information on the use situation of the parking lot that is provided by the parking lot management device 400 (for example, the information on a positional relationship among other vehicles in the parking lot). For example, the autonomous parking controller 142 determines that route change is to be performed when there is another route on which the required time can be shortened as compared with a current travel route.

When the autonomous parking controller 142 has determined that the route change is to be performed, the autonomous parking controller 142 generates a target trajectory on the basis of the route after change and outputs the target trajectory to the second controller 160, so that traveling to the stop area 310 along the route after change is started (step S303). The information provider 136 sets information on the route after change, as the delay information (step S305).

On the other hand, when the autonomous parking controller 142 has determined that the route change is not to be performed, the information provider 136 acquires outside-vehicle information of the host vehicle M on the basis of information input from the camera 10, the radar device 12, and the finder 14 via the object recognition device 16 (step S307). The outside-vehicle information includes, for example, information on an image of an area around the host vehicle M. Then, the information provider 136 sets the outside-vehicle information as the delay information (step S309). The information provider 136 may set, as the delay information, information on a position at which the outside-vehicle information of the host vehicle M has been acquired, together with the outside-vehicle information of the host vehicle M.

Referring back to FIG. 6, the information provider 136 transmits the set delay information to the terminal device 500 (step S215). Thereby, the delay information is displayed on the display unit of the terminal device 500 (step S105).

A screen P3 of the terminal device 500 shown in FIG. 8 is a screen for displaying the delay information when a route has been changed due to the occurrence of the delay. A character string S1 of "a delay has occurred and a route has been changed", which is information indicating the occurrence of the delay and the route change, and map information C indicating a route R2 after change, and the like are displayed on the screen P3. By referring to this screen P3, the occupant can recognize that the delay has occurred and that the route has been changed.

A screen P4 of the terminal device 500 shown in FIG. 8 is a screen for displaying the delay information when the delay has occurred but the route change has not been performed. A character string S2 of "delay occurs", which is information indicating occurrence of the delay, an image FV of an area in front of the host vehicle M, which is outside-vehicle information of the host vehicle M, and the like are displayed on the screen P4. By referring to the screen P4, the occupant can recognize the fact that the delay occurs, and the outside-vehicle information of the host vehicle M (for example, a traffic jam situation of the route).

When it is determined that the delay has not occurred (step S211: NO) or after the delay information has been transmitted (step S215), the autonomous parking controller 142 determines whether or not the host vehicle M has arrived at the stop area 310 (step S217). When the autonomous parking controller 142 has determined that the host vehicle M has not arrived at the stop area 310, the autonomous parking controller 142 determines again whether the delay occurs (step S211), and performs subsequent processes.

On the other hand, when the autonomous parking controller 142 has determined that the host vehicle M has arrived at the stop area 310, the information provider 136 transmits arrival information indicating that the host vehicle M has arrived, to the terminal device 500 (step S219). Thereby, the arrival information is displayed on the display unit of the terminal device 500 (step S107).

A screen P5 of the terminal device 500 shown in FIG. 8 is a screen for displaying the arrival information. A character string S3 of "arrival at the stop area", which is information indicating that the host vehicle M has arrived, or the like is displayed on the screen P5. By referring to the screen P5, the occupant can recognize that the host vehicle M has arrived at the stop area 310. Thus, the process of the flowchart ends.

According to the first embodiment described above, it is possible to provide the occupant with information on the host vehicle M in the automated exit process. In particular, since the information regarding the delay of the host vehicle M in the automated exit process can be provided to the occupant, it is possible to improve convenience of the automated exit process.

Figure 9:
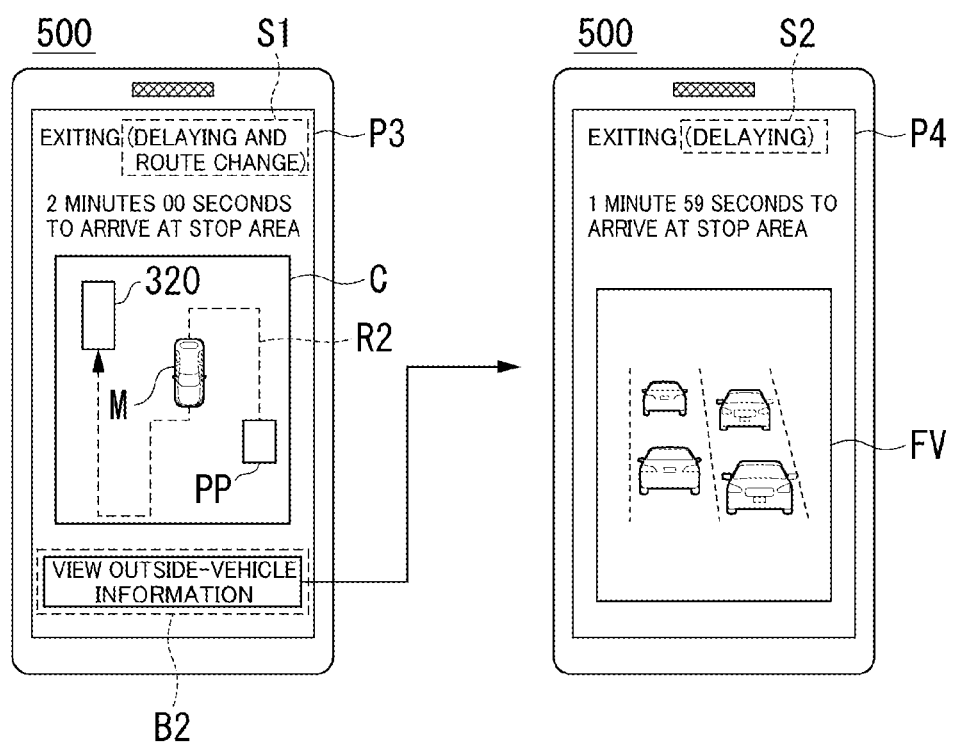
FIG. 9 is a diagram showing another example of the screen flow that is displayed on the screen of the terminal device in the automated exit process according to the first embodiment.

In the first embodiment, an aspect in which the outside-vehicle information of the host vehicle M is displayed on the terminal device 500 only when the delay has occurred in the automated exit process, but the route change has not been performed has been described, but the present invention is not limited thereto. For example, a button B2 "view the outside-vehicle information" for receiving a request for acquisition of the outside-vehicle information (an acquisition request) may be provided on the screen P3 showing that the route change has been performed as shown in FIG. 9, and when the occupant presses the button B2, the screen P4 showing the vehicle-outside information may be displayed on the terminal device 500. A screen on which both the route information after change and the outside-vehicle information are displayed may be displayed on the terminal device 500.

Second Embodiment

Hereinafter, a second embodiment will be described. An automated driving control device 100 of the second embodiment is different from the first embodiment in a control scheme when various types of information are provided to the terminal device 500. Therefore, the drawings and the related descriptions described in the first embodiment are referred to for a configuration or the like, and detailed description will be omitted.

[Autonomous Pick-Up Event-Operation Flow at the Time of Exit]

Figure 10:
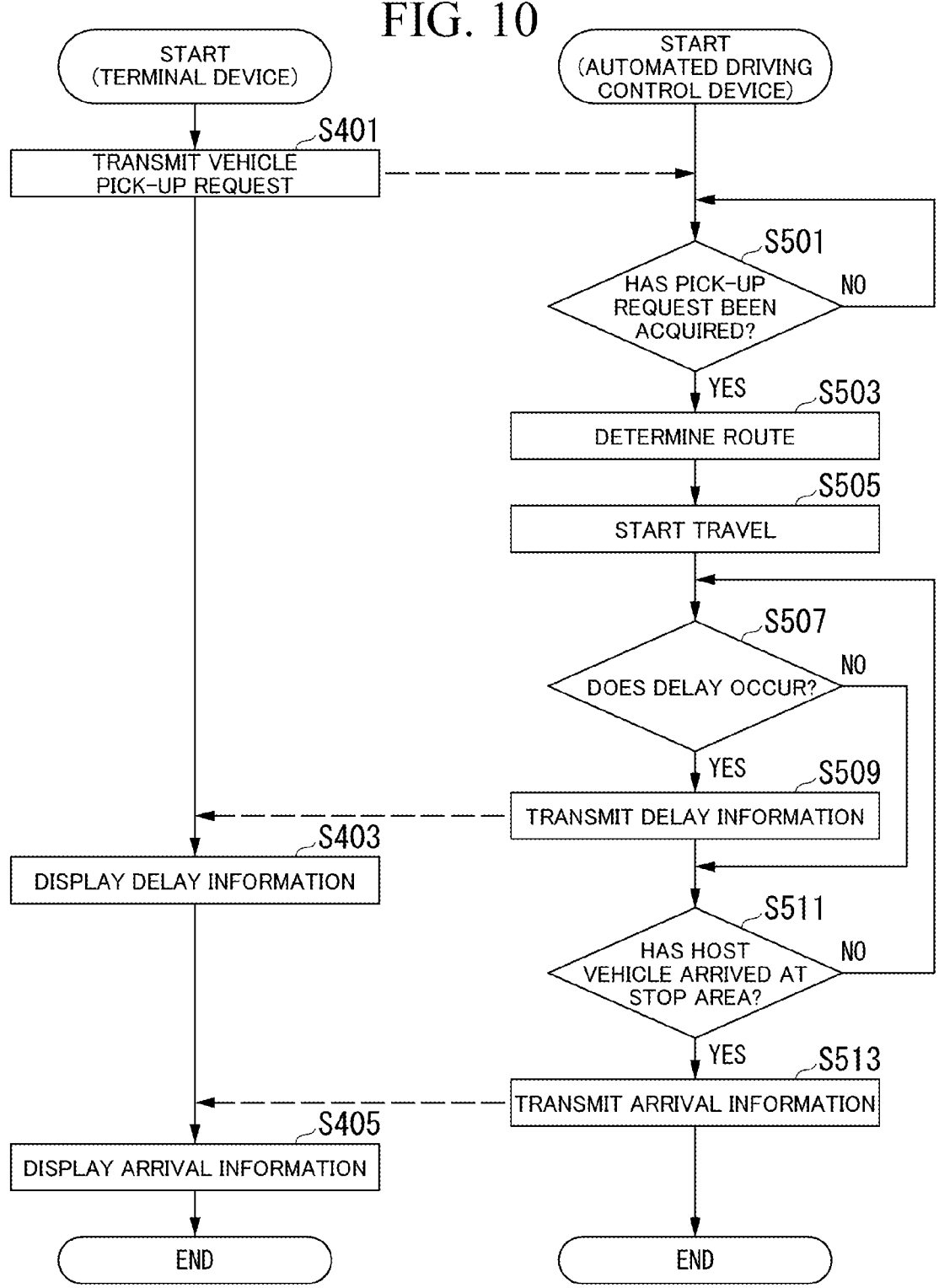
FIG. 10 is a diagram showing an example of an operation flow of at the time of exit in an autonomous pick-up event in an automated driving control device according to a second embodiment.

FIG. 10 is a diagram showing an example of an operation flow of the automated driving control device 100 according to the second embodiment at the time of exit of an autonomous pick-up event. In FIG. 10, an operation of the terminal device 500 is also shown.

The autonomous parking controller 142 remains in an operating state even while the host vehicle M is being parked, and continuously determines whether or not a vehicle pick-up request has been acquired via the request signal acquirer 134 (step S501). Here, when a vehicle pick-up request for the parked host vehicle M is transmitted on the basis of an operation of the terminal device 500 by the occupant (step S401), the autonomous parking controller 142 acquires the vehicle pick-up request and determines a suitable route from the parking position of the host vehicle M to the stop area 310 by referring to the parking lot map information 170 (step S503). The autonomous parking controller 142 may determine a route from the parking position of the host vehicle M to the stop area 310 on the basis of information on a use situation of the parking lot that is provided by the parking lot management device 400 (for example, information on a positional relationship among other vehicles in the parking lot).

Figure 11:
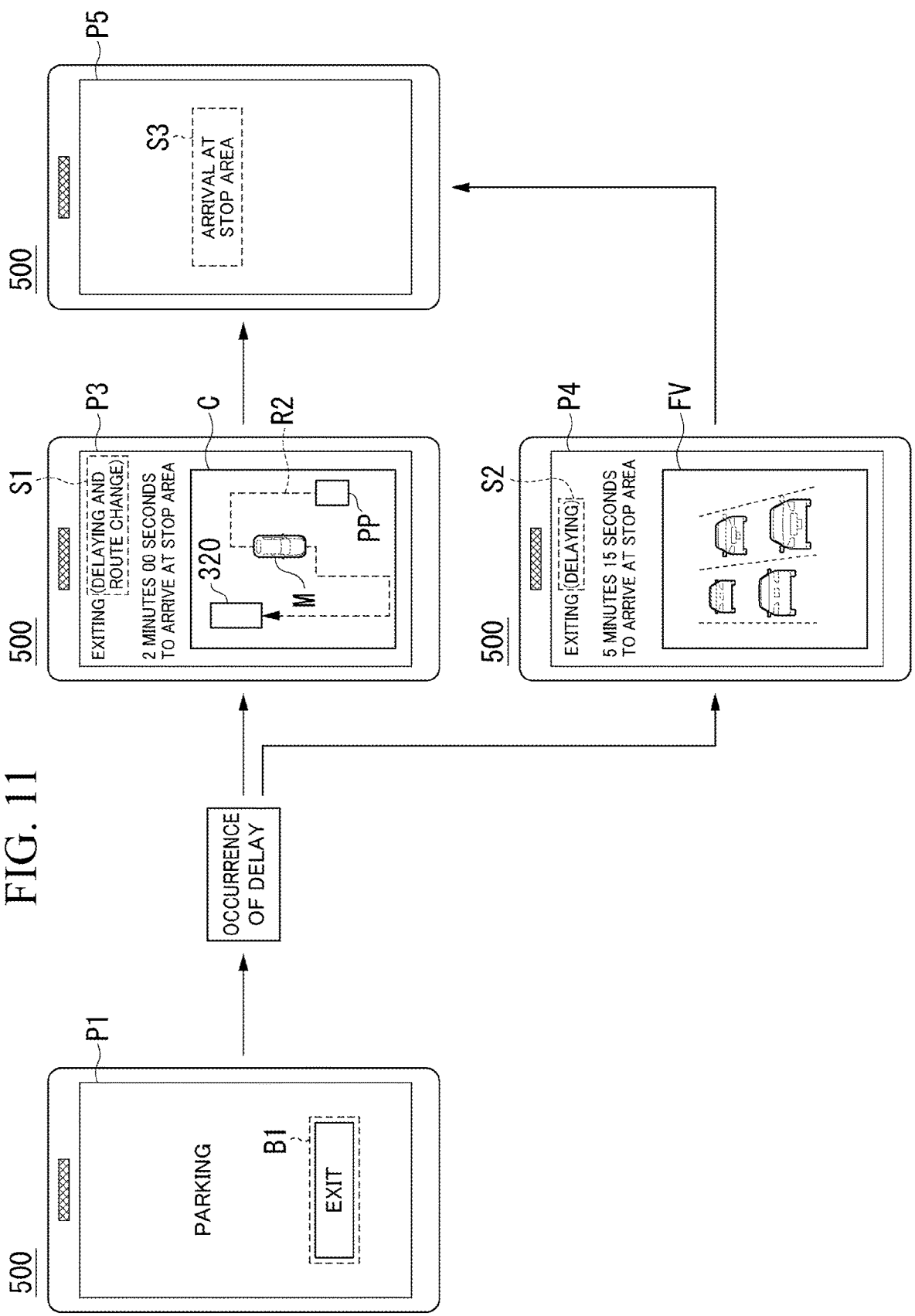
FIG. 11 is a diagram showing an example of a screen flow that is displayed on a screen of a terminal device in an automated exit process according to the second embodiment.

FIG. 11 is a diagram showing an example of a screen flow that is displayed on a screen of the terminal device 500 in the automated exit process according to the second embodiment. A screen P1 is a screen for receiving a vehicle pick-up request for the host vehicle M from the occupant. The occupant can make the vehicle pick-up request by pressing an "Exit" button B1 displayed on the screen P1.

Then, the autonomous parking controller 142 generates a target trajectory on the basis of the determined route and outputs the target trajectory to the second controller 160, thereby starting traveling from the parking position PP to the stop area 310 (step S505).

Then, the autonomous parking controller 142 determines whether or not a delay occurs during traveling from the parking position PP to the stop area 310 (step S507). For example, the autonomous parking controller 142 determines that the delay occurs when the host vehicle M has stopped during a predetermined time or more in the automated exit process or when the host vehicle M has traveled during a predetermined time or more and a predetermined speed or less in the automated exit process.

When the autonomous parking controller 142 has determined that the delay occurs, the information provider 136 transmits delay information for notifying the occupant waiting for the arrival of the host vehicle M of the occurrence of the delay to the terminal device 500 (step S509). Thereby, the delay information is displayed on the display unit of the terminal device 500 (step S403).

A screen P3 or a screen P4 shown in FIG. 11 is displayed on the display unit of the terminal device 500. The screen P3 is a screen for displaying delay information indicating occurrence of delay and route change. A character string S1 of "a delay has occurred and a route has been changed", which is information indicating the occurrence of the delay and the route change, and map information C indicating a route R2 after change, and the like are displayed on the screen P3. By referring to this screen P3, the occupant can recognize that the delay has occurred and that the route has been changed.

On the other hand, a screen P4 is a screen for displaying the delay information when the delay has occurred. A character string S2 of "delay occurs", which is information indicating occurrence of the delay, an image FV of an area in front of the host vehicle M, which is outside-vehicle information of the host vehicle M, and the like are displayed on the screen P4. By referring to the screen P4, the occupant can recognize the occurrence of the delay and the outside-vehicle information of the host vehicle M (for example, a traffic jam situation of the route).

When it is determined that the delay has not occurred (step S507: NO) or after the delay information has been transmitted (step S509), the autonomous parking controller 142 determines whether or not the host vehicle M has arrived at the stop area 310 (step S511). When the autonomous parking controller 142 has determined that the host vehicle M has not arrived at the stop area 310, the autonomous parking controller 142 determines again whether the delay occurs (step S507) and performs subsequent processes.

On the other hand, when the autonomous parking controller 142 has determined that the host vehicle M has arrived at the stop area 310, the information provider 136 transmits arrival information indicating that the host vehicle M has arrived, to the terminal device 500 (step S513). Thereby, the arrival information is displayed on the display unit of the terminal device 500 (step S405).

A screen P5 of the terminal device 500 shown in FIG. 11 is a screen for displaying the arrival information. A character string S3 of "arrival at the stop area", which is information indicating that the host vehicle M has arrived, or the like is displayed on the screen P5. By referring to the screen P5, the occupant can recognize that the host vehicle M has arrived at the stop area 310. Thus, the process of the flowchart ends.

According to the second embodiment described above, it is possible to provide the occupant with information on the host vehicle M in the automated exit process. In particular, since the information regarding the delay can be provided to the occupant when the delay has occurred in the automated exit process, it is possible to improve convenience of the automated exit process.

In the second embodiment, an aspect in which, when a delay has occurred in the automated exit process, any one of the screen P3 indicating the route information after change and the screen P4 indicating the outside-vehicle information is displayed on the terminal device 500 has been described, but the present invention is not limited thereto. For example, a screen on which both the route information after change and the outside-vehicle information are displayed may be displayed on the terminal device 500. A button "View the Outside-Vehicle Information" for receiving a request to acquire outside-vehicle information may be provided in the screen P3, and the screen P4 may be displayed on the terminal device 500 when the occupant has pressed this button. A button "View the Route Information" for receiving a request to acquire route information may be provided in the screen P4, and the screen P3 may be displayed on the terminal device 500 when the occupant has pressed this button.

In the above embodiment, an example in which the autonomous parking event is mainly performed between the parking area PA provided in the same facility, and the stop area 310 and the boarding and alighting area 320 has been described, but the present invention is not limited thereto. For example, when a vehicle parked in a parking lot located away from the occupant (a parking lot outside a facility in which the occupant is located) exits the parking lot, travels on roads (such as public roads) outside the parking lot, and moves to a position of the occupant, the route information, information on the vehicle, and the like may be transmitted to the occupant terminal device.

[Hardware Configuration]

Figure 12:
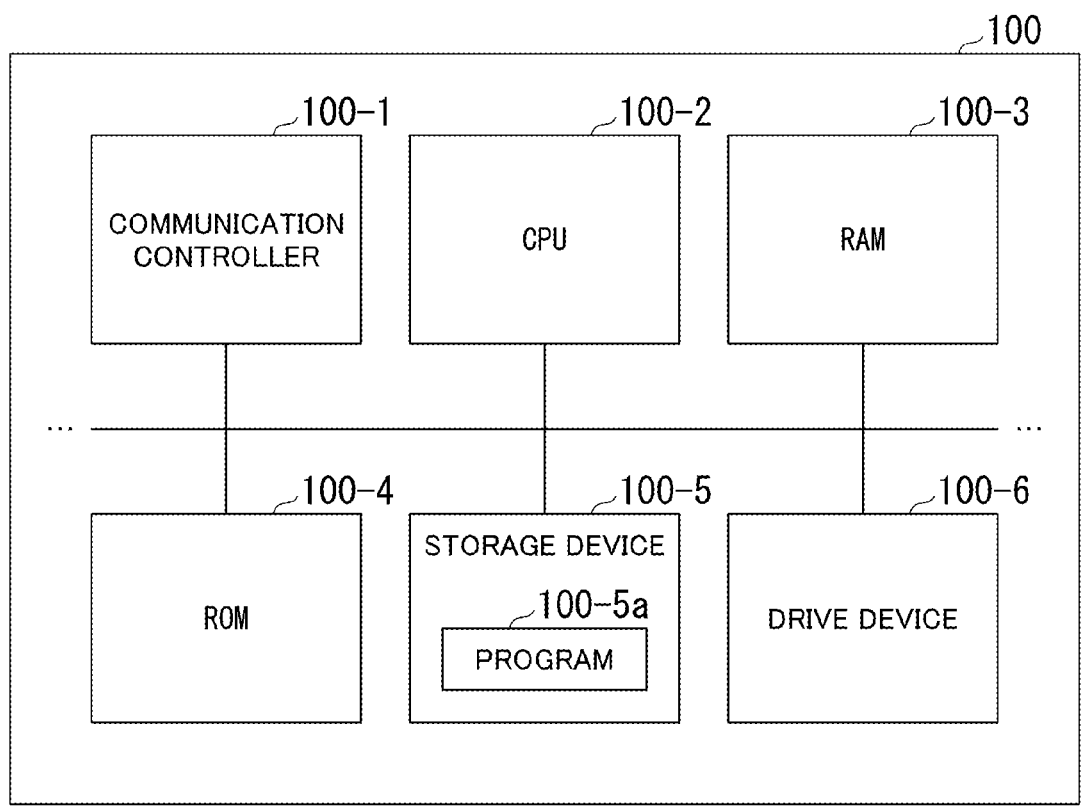
FIG. 12 is a diagram showing an example of a hardware configuration of the automated driving control device according to the embodiment.

FIG. 12 is a diagram showing an example of a hardware configuration of the automated driving control device 100 according to the embodiment. As shown in FIG. 14, the automated driving control device 100 (a computer) has a configuration in which a communication controller 100-1, a CPU 100-2, a random access memory (RAM) 100-3 that is used as a working memory, a read only memory (ROM) 100-4 that stores a boot program or the like, a storage device 100-5 such as a flash memory or a hard disk drive (HDD), a drive device 100-6, and the like are connected to each other by an internal bus or a dedicated communication line. The communication controller 100-1 communicates with components other than the automated driving control device 100. A program 100-5*a* to be executed by the CPU 100-2 is stored in the storage device 100-5. This program is developed in the RAM 100-3 by a direct memory access (DMA) controller (not shown) or the like and executed by the CPU 100-2. Thereby, one or both of the first controller 120 and the second controller 160 are realized.

The embodiments described above can be represented as follows.

A vehicle control device mounted in a vehicle, the vehicle control device including a storage device storing a program, and a hardware processor configured to provide information on a route from a parking position to a boarding position of the vehicle to a terminal device, by the hardware processor executing the program stored in the storage device.

The embodiments described above can be represented as follows.

A vehicle control device mounted in a vehicle, the vehicle control device including a storage device storing a program, and a hardware processor configured to transmit information on the vehicle to a terminal device when a delay has occurred in an automated exit process of the vehicle, by the hardware processor executing the program stored in the storage device.

While forms for carrying out the present invention have been described using the embodiments, the present invention is not limited to these embodiments at all, and various modifications and substitutions can be made without departing from the gist of the present invention.

What is claimed is:

1. A vehicle control device mounted in a vehicle, the vehicle control device comprising a processor configured to execute a program to:
   acquire an automated exit request for the vehicle;
   determine a route from a parking position of the vehicle to a boarding position in response to the acquired automated exit request; and
   transmit information on the determined route to a terminal device of an occupant of the vehicle;
   wherein the processor is configured to execute the program to transmit outside-vehicle information of the vehicle to the terminal device in a case where information on a delay of the vehicle during an automated exit process of the vehicle based on the automated exit request has been acquired.

2. The vehicle control device according to claim 1, wherein the processor is configured to execute the program to transmit outside-vehicle information of the vehicle to the terminal device in a case where the vehicle has stopped during a predetermined time or more in the automated exit process of the vehicle based on the automated exit request.

3. The vehicle control device according to claim 1, wherein the processor is configured to execute the program to transmit outside-vehicle information of the vehicle to the terminal device in a case where the vehicle has traveled during a predetermined time or more and at a predetermined speed or less in the automated exit process of the vehicle based on the automated exit request.

4. The vehicle control device according to claim 1, wherein the processor is configured to execute the program to transmit information on a position at which the outside-vehicle information of the vehicle has been acquired, together with the outside-vehicle information of the vehicle, to the terminal device.

5. The vehicle control device according to claim 1, wherein the processor is configured to execute the program to acquire the automated exit request transmitted from the terminal device.

6. The vehicle control device according to claim 1, wherein the processor is configured to execute the program to:
   further acquire a request for acquisition of
   outside-vehicle information of the vehicle transmitted from the terminal device; and
   transmit the outside-vehicle information of the vehicle to the terminal device in a case where the request for acquisition of the outside-vehicle information has been acquired.

7. The vehicle control device according to claim 1, wherein the processor is configured to execute the program to transmit outside-vehicle image information of the vehicle to the terminal device.

8. The vehicle control device according to claim 1, wherein the processor is configured to execute the program to transmit, to the terminal device, information on change in a route to the boarding position.

9. The vehicle control device according to claim 1, wherein the processor is configured to execute the program to transmit, to the terminal device, information on a required time required for movement from a position of the vehicle to the boarding position.

10. A vehicle control method comprising:
    acquiring, by a computer of a vehicle control device mounted in a vehicle, an automated exit request for the vehicle;
    determining, by the computer, a route from a parking position of the vehicle to a boarding position in response to the acquired automated exit request; and
    transmitting, by the computer, information on the determined route to a terminal device of an occupant of the vehicle;
    transmitting outside-vehicle information of the vehicle to the terminal device in a case where information on a delay of the vehicle during an automated exit process of the vehicle based on the automated exit request has been acquired.

11. A non-transitory computer-readable storage medium storing a program, the program causing a computer of a vehicle control device mounted in a vehicle to:
    acquire an automated exit request for the vehicle;
    determine a route from a parking position of the vehicle to a boarding position in response to the acquired automated exit request; and
    transmit information on the determined route to a terminal device of an occupant of the vehicle;
    transmit outside-vehicle information of the vehicle to the terminal device in a case where information on a delay of the vehicle during an automated exit process of the vehicle based on the automated exit request has been acquired.

* * * * *